United States Patent
Hartung

(10) Patent No.: US 7,574,620 B2
(45) Date of Patent: Aug. 11, 2009

(54) METHOD FOR OPERATING AN ARRANGEMENT OF A PLURALITY OF COMPUTERS IN THE EVENT OF A COMPUTER FAILURE

(75) Inventor: Klaus Hartung, Salzkotten (DE)

(73) Assignee: Fujitsu Siemens Computers GmbH, Munich (DE)

( * ) Notice: Subject to any disclaimer, the term of this patent is extended or adjusted under 35 U.S.C. 154(b) by 397 days.

(21) Appl. No.: 11/497,525

(22) Filed: Aug. 2, 2006

(65) Prior Publication Data

US 2007/0038885 A1 Feb. 15, 2007

Related U.S. Application Data

(63) Continuation of application No. PCT/DE2004/001862, filed on Aug. 20, 2004.

(30) Foreign Application Priority Data

Feb. 2, 2004 (DE) ................ 10 2004 005 128

(51) Int. Cl.
G06F 11/00 (2006.01)
(52) U.S. Cl. .................. 714/4; 709/221; 714/38
(58) Field of Classification Search ........... 714/4, 714/38, 43, 47; 709/221, 223, 225
See application file for complete search history.

(56) References Cited

U.S. PATENT DOCUMENTS

| | | | |
|---|---|---|---|
| 5,822,531 A * | 10/1998 | Gorczyca et al. ............ 709/221 |
| 5,987,621 A * | 11/1999 | Duso et al. ..................... 714/4 |
| 5,991,894 A * | 11/1999 | Lee et al. ........................ 714/6 |
| 6,067,545 A * | 5/2000 | Wolff ........................... 707/10 |
| 6,088,727 A | 7/2000 | Hosokawa et al. |

(Continued)

FOREIGN PATENT DOCUMENTS

JP 7044413 2/1995

(Continued)

OTHER PUBLICATIONS

Rabbat, R.; McNeal, T.; Burke, T., "A high-availability clustering architecture with data integrity guarantees," Cluster Computing, 2001. Proceedings. 2001 IEEE International Conference on , vol., No., pp. 178-182, 2001.*

(Continued)

*Primary Examiner*—Robert Beausoliel
*Assistant Examiner*—Joshua P Lottich
(74) *Attorney, Agent, or Firm*—Edell, Shapiro & Finnan, LLC

(57) ABSTRACT

A method is established for operating an arrangement of a plurality of computers that are configured to execute software units. Continuous monitoring of the plurality of computers and intervening with any failed computers is performed via a monitoring computer. The software units are assigned a weighting in accordance with their importance, and the method steps are invoked in the event of a computer failing. At the monitoring time, information regarding the failure of all of the failed computers and software units affected is thereby collected. The software units, that are affected by the failure or failures, are transferred to other computers. The transfer is determined via the weighting of the software units.

7 Claims, 2 Drawing Sheets

U.S. PATENT DOCUMENTS

| | | | |
|---|---|---|---|
| 6,134,673 A | 10/2000 | Chrabaszcz | |
| 6,192,401 B1 | 2/2001 | Modiri et al. | |
| 6,442,584 B1* | 8/2002 | Kolli et al. | 718/104 |
| 6,460,082 B1* | 10/2002 | Lumelsky et al. | 709/226 |
| 6,662,219 B1* | 12/2003 | Nishanov et al. | 709/220 |
| 6,769,008 B1* | 7/2004 | Kumar et al. | 709/201 |
| 6,854,069 B2* | 2/2005 | Kampe et al. | 714/4 |
| 6,922,791 B2* | 7/2005 | Mashayekhi et al. | 714/4 |
| 6,944,788 B2* | 9/2005 | Dinker et al. | 714/4 |
| 6,954,884 B2* | 10/2005 | Dean et al. | 714/51 |
| 6,990,605 B2* | 1/2006 | Noda et al. | 714/6 |
| 6,990,606 B2* | 1/2006 | Schroiff et al. | 714/7 |
| 7,043,619 B1* | 5/2006 | Knight | 711/170 |
| 7,089,448 B2* | 8/2006 | Hinshaw et al. | 714/6 |
| 7,093,086 B1* | 8/2006 | van Rietschote | 711/161 |
| 7,124,320 B1* | 10/2006 | Wipfel | 714/13 |
| 7,139,930 B2* | 11/2006 | Mashayekhi et al. | 714/4 |
| 7,143,413 B2* | 11/2006 | McCarthy et al. | 718/104 |
| 7,146,353 B2* | 12/2006 | Garg et al. | 707/2 |
| 7,152,181 B2* | 12/2006 | Fung et al. | 714/4 |
| 7,178,050 B2* | 2/2007 | Fung et al. | 714/4 |
| 7,222,148 B2* | 5/2007 | Potter et al. | 709/201 |
| 7,287,179 B2* | 10/2007 | Doyle et al. | 714/4 |
| 7,330,999 B2* | 2/2008 | Davies et al. | 714/9 |
| 7,379,996 B2* | 5/2008 | Papatla et al. | 709/224 |
| 7,380,155 B2* | 5/2008 | Fung et al. | 714/4 |
| 7,392,302 B2* | 6/2008 | Halpern | 709/223 |
| 7,392,421 B1* | 6/2008 | Bloomstein et al. | 714/4 |
| 7,403,996 B2* | 7/2008 | Halpern | 709/228 |
| 7,409,577 B2* | 8/2008 | Wing et al. | 714/4 |
| 7,433,945 B2* | 10/2008 | Ng et al. | 709/223 |
| 7,444,335 B1* | 10/2008 | Colrain et al. | 707/10 |
| 7,478,149 B2* | 1/2009 | Joshi et al. | 709/223 |
| 2002/0184571 A1 | 12/2002 | Dean et al. | |
| 2003/0018927 A1* | 1/2003 | Gadir et al. | 714/4 |
| 2003/0182427 A1* | 9/2003 | Halpern | 709/226 |
| 2003/0233433 A1* | 12/2003 | Halpern | 709/222 |
| 2004/0078440 A1* | 4/2004 | Potter et al. | 709/206 |
| 2004/0128442 A1* | 7/2004 | Hinshaw et al. | 711/114 |
| 2004/0153708 A1* | 8/2004 | Joshi et al. | 714/4 |
| 2004/0158766 A1* | 8/2004 | Liccione et al. | 714/4 |
| 2004/0249939 A1* | 12/2004 | Amini et al. | 709/225 |
| 2005/0022047 A1* | 1/2005 | Chandrasekaran | 714/4 |
| 2005/0268155 A1* | 12/2005 | Mashayekhi et al. | 714/4 |
| 2005/0268156 A1* | 12/2005 | Mashayekhi et al. | 714/4 |
| 2006/0010338 A1* | 1/2006 | Schroiff et al. | 714/4 |
| 2006/0173875 A1* | 8/2006 | Stefaniak | 707/101 |
| 2006/0179124 A1* | 8/2006 | Stefaniak et al. | 709/219 |
| 2006/0179171 A1* | 8/2006 | Stefaniak et al. | 710/15 |
| 2006/0179431 A1* | 8/2006 | Devanathan et al. | 717/168 |
| 2007/0067435 A1* | 3/2007 | Landis et al. | 709/224 |
| 2007/0294578 A1* | 12/2007 | Qiao et al. | 714/17 |
| 2009/0024868 A1* | 1/2009 | Joshi et al. | 714/4 |

FOREIGN PATENT DOCUMENTS

| | | |
|---|---|---|
| JP | 2002007368 | 1/2002 |
| JP | 2002108839 | 4/2002 |
| JP | 2003203018 | 7/2003 |
| WO | 03/102772 A2 | 12/2003 |

OTHER PUBLICATIONS

Siemens Business Services GMBH: Release Notice: Primecluster Wizard Tools V4.1A20 "Online! Dec. 2003, S. 1-9.

Siemens Business Services GMBH & CO. OHG: Release Notice: Primecluster Wizard Tools V4.1A10 "Online! Apr. 2003, S. 1-6.

English Translation of Examination Report in Counterpart Japanese Application No. 2006-549844, dated Mar. 3, 2009.

* cited by examiner

|    | L2K | SL | Action       | Old computer | New computer |
|----|-----|----|--------------|--------------|--------------|
| A1 | 3   | 3  | Transfer to 4 | 1           | 4            |
| A2 | 4   | 3  | Terminate    | 2            | -            |
| A3 | 4   | 2  | Transfer to 2 | 3           | 2            |
| A4 | 5   | 4  | Transfer to 4 | 3           | 4            |
| D1 | 2   | 2  | -            | 2            | 2            |
| D2 | 2   | 2  | -            | 2            | 2            |
| D3 | 4   | 1  | Transfer to 2 | 3           | 2            |
| D4 | 2   | 3  | -            | 3            | -            |
| D5 | 1   | 2  | -            | 3            | -            |

|    | L2K | SL | Software units      | Old computer | New computer |
|----|-----|----|---------------------|--------------|--------------|
| I1 | 4   | 3  | OS1, A1             | 1            | 4            |
| I2 | 2   | 3  | OS2, A2, D1, D2     | 2            | 2            |
| I3 | 2   | 1  | OS3, A3, A4, D4, D5 | 3            | -            |

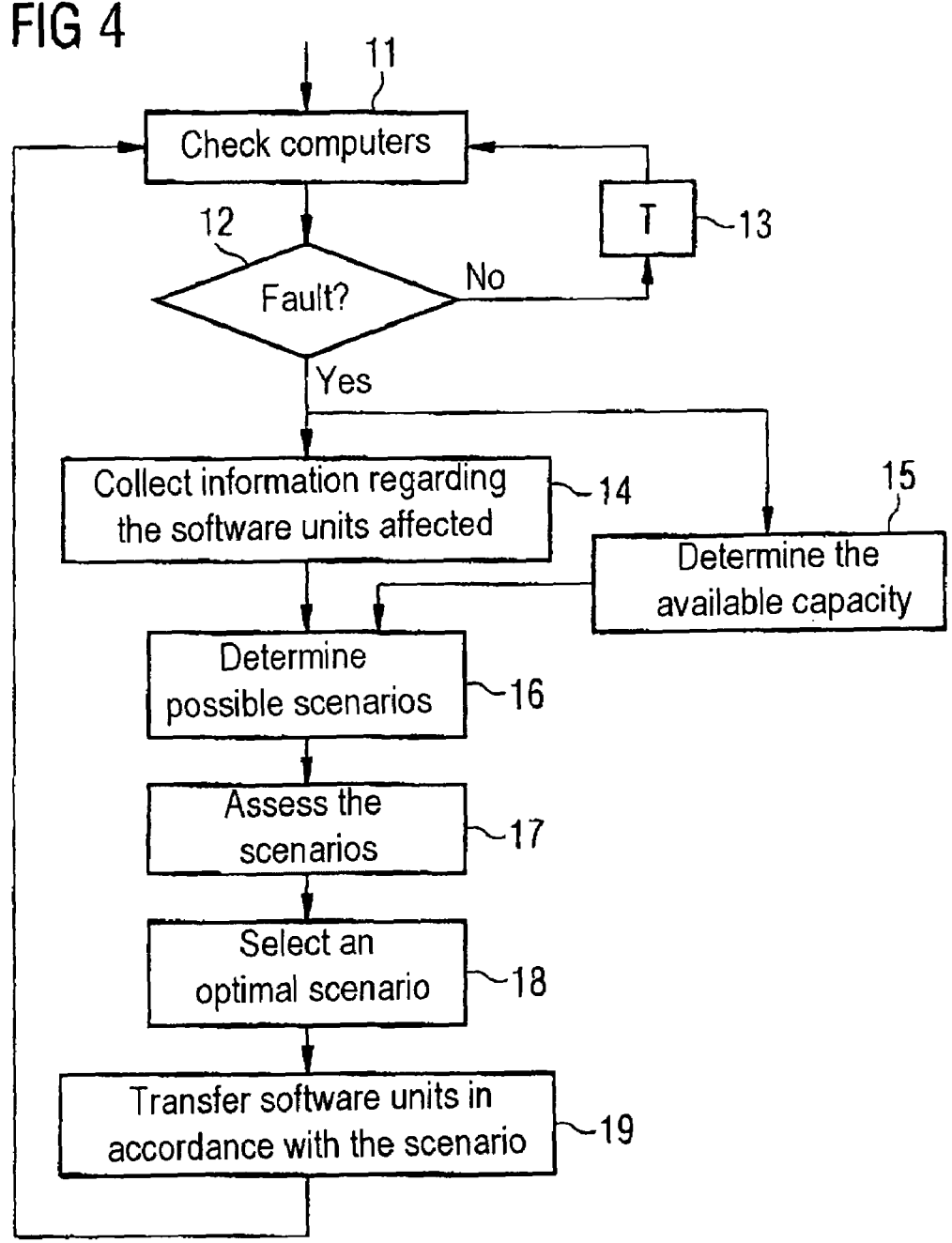

METHOD FOR OPERATING AN ARRANGEMENT OF A PLURALITY OF COMPUTERS IN THE EVENT OF A COMPUTER FAILURE

CROSS REFERENCE TO RELATED APPLICATIONS

This application is a continuation of International Application No. PCT/DE2004/001862, and filed Aug. 20, 2004, which claims priority to Application No. DE 102004005128.3 filed on Feb. 2, 2004, entitled "Method for Operating an Arrangement of a Plurality of Computers in the Event of a Computer Failure," the entire contents of which are hereby incorporated by reference.

FIELD OF THE INVENTION

The invention relates to a method for operating an arrangement of a plurality of computers which are set up to execute software units, provision being made of an additional monitoring computer for monitoring the computers and for intervening in the computers, and the status of the computers being repeatedly monitored.

BACKGROUND

Computer arrangements of this type are known, inter alia, under the term server farm. Server farms usually comprise a large number of identical servers which are also referred to below as computers and on which the same or different services or applications run. Since all servers execute the services and applications independently of one another, faults in one server do not have a direct influence on the rest of the server farm. User inquiries are distributed to all members of the server farm in accordance with defined rules. This is the task of the monitoring computer. Mechanisms which have been implemented for distributing the load ensure that use of the individual servers corresponds to the respective processing capacity.

The failure of one server is relatively unproblematic since only a few services and applications are affected thereby. Since the individual computers are relatively small and thus inexpensive devices, it is unproblematic, from the point of view of costs, to keep one or more standby computers ready, to which, after a computer has failed, the software units affected, i.e. services and applications, for example, are transferred in order to thus restore normal operation.

However, server farms often comprise several hundred computers. In the case of these so-called blade servers, there is no need for the external wiring complexity since the computers are accommodated and connected in the form of a plug-in card. However, the problem with this design is that, in the event of a power supply unit, for example, failing, a plurality of computers are affected and thus a plurality of computers simultaneously fail. For economic reasons, it is not possible to provide, for every case, as many standby computers as are actually required on account of the failure. Satisfactory operation of the computer arrangement is thus not ensured in every case.

When a software unit fails on account of the failure of a computer, it is known practice to transfer the software unit to a standby computer, that is to say to restart it there. If a plurality of computers fail, a plurality of software units are therefore affected. An attempt is then made, for each software unit, to find a standby computer or a sufficiently large amount of free capacity in a standby computer in order to be able to restart the software unit. This results in competitive situations, thus jeopardizing fault-free operation.

SUMMARY

According to the invention, a method for operating an arrangement of a plurality of computers, in which the best possible availability of the software units which are executed in the computer arrangement, is ensured. In this case, both the failure of an individual computer and the failure of a plurality of computers are intended to be taken into account.

The software units are assigned a weighting in accordance with their importance, and the following method steps are carried out in the event of a computer failing:

information regarding all of the computers which have failed at the monitoring time and software units affected thereby is collected, and a transfer scenario for transferring the software units which are affected by the other computers is determined using the weighting of the software units.

The method according to the invention follows the finding that, under certain circumstances, a computer having sufficient free capacity cannot be found for all software units. A transfer scenario which specifies which software units are transferred to which computers is sought. Weighting the software units in accordance with their importance achieves the advantage that a transfer scenario which, when considered overall, constitutes an optimal solution is determined, the more important software units thus preferably being transferred to another computer, while unimportant software units are not restarted.

The decisive advantage of the present method according to the invention is that the transfer of software units to other computers is determined not only with regard to an individual software unit but rather the server farm with its software units is considered as a whole in order to disrupt overall operation as little as possible. It is also advantageous that not only the failure of an individual computer can be taken into account but rather a plurality of computers which have simultaneously failed and the software units which have correspondingly failed are also included in the determination of a transfer scenario.

In one advantageous refinement of the method according to the invention, a multiplicity of possible transfer scenarios are first determined and these scenarios are then assessed using the weighting of the software units. The assessment of the overall scenario can be used to discern which is the optimal scenario overall.

In one development of the invention, the process of determining a transfer scenario includes the fact that active software units are terminated in other computers in order to create free capacity for transferring software units from computers which have failed. In this case, it is advantageous that active software units of lesser importance are terminated in order to create capacity for transferring software units which are of greater importance and were previously active in one of the failed computers.

In one favorable refinement, the weighting is effected using a plurality of attributes, a first "license to kill" attribute specifying a measure of the power to have other active software units terminated in order to create free capacity and a second "shutdown limit" attribute specifying a measure of the resistance to the request for termination by other software packages in order to be transferred from a computer which has failed. The first attribute is used to determine which of the failed software units are preferably transferred to a standby computer, that is to say are restarted there. The second attribute is used to find out which of the active software packages are terminated in order to create space for transferring software packages which were previously active on a computer which has now failed.

In this case, it is favorable that the behavior of the computer arrangement, when transferring failed software units, can be influenced by an administrator by appropriately allocating attributes.

Within the scope of this application, software units may be services, applications or packages from an operating system and services and/or applications. The packages which were mentioned last and which are also referred to as "images" are used, in particular, in large server farms having blade servers. When booting a server within the server farm, an image is loaded from a central memory and is executed in the server. If a second server is intended to be started using the same application, a copy of the image is simply loaded into the second server and executed there. In this way, the configuration complexity is minimal.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

FIG. 4 shows a flowchart of one exemplary embodiment of the method according to the invention.

DETAILED DESCRIPTION

Figures 1, 2, 3:
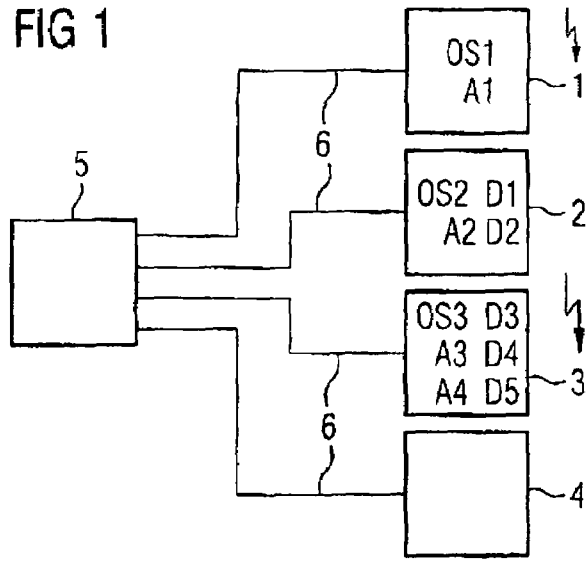
FIG. 1 shows an arrangement having a plurality of computers and a monitoring computer, to which the method according to the invention can be applied.
FIG. 2 shows a table corresponding to a first transfer scenario.
FIG. 3 shows a table corresponding to a second transfer scenario.

FIG. 1 illustrates an arrangement having a plurality of computers 1, 2, 3, 4 and a monitoring computer 5. The computers 1, 2, 3 and 4 do not have a connection which has been set up to interchange data. However, they are connected to the monitoring computer 5 via lines 6. These connections which have been implemented in any desired manner and use the lines 6 are used to monitor the computers 1, 2, 3 and 4 and to intervene, if necessary, in the sequences in these computers.

In the example shown, an operating system OS1 and an application A1 are active in the computer 1. Active is hereby defined as the operating system and the application being in a normal operating state. An operating system OS2 and an application A2 are active in the computer 2. In addition, two services D1 and D2 are running on the computer 2. An operating system OS3 and two applications A3 and A4 as well as three services D3, D4 and D5 are active in the computer 3. The computer 4 is a standby computer in which neither an operating system nor an application nor a service is active in the operating state shown.

The monitoring computer 5 monitors the status of the computers 1, 2 and 3 at regular intervals of time T in order to determine whether they are in a normal operating state or whether there is a fault state (see FIG. 2). The computer 4 does not need to be monitored since the monitoring computer 5 is aware of its status as a standby computer. Monitoring may be configured in such a manner that the monitoring computer 5 sends an inquiry to the computers 1, 2, 3 and 4 and then waits to see whether a response is sent back. However, detectors which automatically monitor the operating state and transmit a fault message to the monitoring computer 5 if there is a deviation from the normal operating state may also be provided in the computers 1, 2, 3 and 4. Both types of monitoring may also be combined, that is to say the computers 1, 2, 3 and 4 automatically transmit fault reports but also respond to inquiries from the monitoring computer 5.

If the description of the invention refers to the reception or transmission of inquiries or reports by the "computers", this includes both information processing using hardware and processing using software by the respective active operating systems, applications or services.

The computers 1, 2 and 3 may be operated using different operating systems. It must merely be ensured that message or command transmission via the lines 6 functions in accordance with the same standard so that the monitoring computer 5 can communicate with all of the computers 1, 2, 3 and 4.

In the embodiment described here, the computers 1, 2 and 3 are checked (step 11) at regular intervals of time T, as shown in FIG. 4. If a fault is not established in step 12, the process waits for the point in time at which a new check is intended to be carried out. If a fault was detected, information regarding the software units affected is then collected (step 14). In an example scenario, it is assumed that the computers 1 and 3 have failed. This fault was detected by the monitoring computer 5. In step 14, information regarding the software units which have been affected by the failures is then collected. In this case, it is established that the applications A1, A3 and A4 as well as the services D3, D4 and D5 have been affected by the failure. In addition, the available capacity is determined in a step 15 which subsequently takes place or takes place in parallel. In the present case, the computer 4 is available as a standby computer. If the capacity available in the latter does not suffice, it would be necessary to check the importance of the applications A2 and the services D1 and D2 which are active in the computer 2 in comparison with the importance of the applications A1, A3 and A4 and the services D3, D4 and D5 which are to be transferred.

After the software units to be transferred and the available capacity have then been determined, possible scenarios for transferring the software units, which have been affected by the failure or failures, to other computers may be carried out (step 16). A scenario which is optimal overall must then be selected from the multiplicity of possible scenarios. In this case, optimal overall is hereby defined such that both the interest in transferring failed software units to other computers is taken into account and operation of the software units, which are still active, is retained as completely as possible.

Two situations occur, in principle. In the first situation, enough free capacity is available to be able to transfer all of the failed software units. In the other situation, the number of failed computers is greater than the number of standby computers. Therefore, in the submethods for determining the transfer scenario, it is first of all necessary to determine which of the failed software units are transferred to the standby computers. The importance of the remaining failed software units is investigated and it is determined whether or not they are transferred to another computer, the software units which are currently running on this computer being forced to be terminated. If it is not possible to find a new computer for all of the failed software units, the least important software units of the failed software units are determined and the entire process of determining the transfer scenario is started from the beginning.

When creating possible transfer scenarios, it is also necessary to take into account whether a software unit is understood as meaning an application or a service or whether a software unit corresponds to an image. In the first case, the application or the services can be transferred to a computer in which other applications or services are already active and which is operated using a suitable operating system. In the second case, a completely free computer must be available since the image also comprises the operating system and only one image per computer is possible.

One possible scenario for transferring applications and services is illustrated in the table shown in FIG. 2. Two attributes "license to kill" (L2K) and "shutdown limit" (SL) are assigned to the applications A1 . . . A4 and to the services D1 . . . D5. The first attribute L2K is a measure of the power to have other active software units terminated by the monitoring computer 5 in order to create free capacity. The second attribute SL is a measure of the resistance to the request for termination by other software packages in order to be transferred from a computer which has failed. The fact of whether an application is terminated and sufficient capacity is thus provided for transferring another application thus depends on the "license to kill" attribute of the application to be transferred and on the "shutdown limit" attribute of the application which is still active and may possibly be terminated. The same applies in the case of a service. The attributes described are likewise assigned to the services.

Returning to the scenario described in FIG. 1, according to which the computers 1 and 3 have failed, the computer 4 is available as a standby computer and an application A2 and two services D1 and D2 are already active in the computer 2, the optimal scenario shown in the table in FIG. 2 could result. The values entered in the table are to be understood such that 1 is the lowest value and 5 is the highest value. The higher the value, the higher the importance of the respective application or of the respective service. According to this example scenario, the applications A4 and A1 are restarted in the standby computer 4, that is to say are assumed by the latter. There is no longer sufficient free capacity in the computer 4 for the application A3. However, the attribute L2K has the value 4 which is greater than the value of the attribute SL of the application A2. Comparing these values reveals that the application A2 is to be terminated so that the application A3 can be restarted in the computer 2.

The services D1 and D2 can continue to run on the computer 2. The service D3 in the computer 3 is restarted in the computer 2. The services D4 and D5 no longer have any space in the computers 2 and 4. They have a very low value as regards the "license to kill" attribute, with the result that no services or application is/are terminated in order to create free capacity for the services D4 and D5. These services therefore cannot be transferred to another computer.

In FIG. 3, transfer for each application or service is not considered but rather, in the case of a transfer, only the entire image can be transferred. The image I1 comprises an operating system OS1 and an application A1, as were active in the computer 1 before the failure. The image I2 comprises the operating system OS2 which is running on the computer 2, the application A2 and the services D1 and D2. The image I3 comprises the operating system OS3 which was active in the computer 3 before the failure, the applications A3 and A4 and the services D4 and D5. The images are in turn assigned the attributes L2K and SL.

According to the example scenario shown in FIG. 3, the image I1 is restarted in the computer 4, the image I2 remains active in the computer 2 and no free computer can be found for the image I3. Although the image I2 could be terminated in order to restart the image I3 in the computer 2, the "license to kill" attribute of the image I3 with the value 2 is less than the value of the "shutdown limit" attribute of the image I2. Therefore, the image I3 does not have the power to have the image I2 terminated in order to create free capacity.

In step 17, the scenarios are thus assessed by linking the attributes of all active applications and all software units which are affected by the failure with the possible scenarios. In step 18, an optimal scenario is selected, on the basis of the weighting using the attributes in the situation described. In a step 19, the optimal transfer scenario determined is implemented, software units are terminated and failed software units are restarted in the newly determined computers, with the result that a transfer is effected. After this stable state has been reached, the method begins from the beginning with checking the status of the computers.

The boundary conditions for creating a scenario follow defined rules. Rules which may play a role in forming transfer scenarios are described below:

an image may simultaneously run only on one server and a server may simultaneously receive only one image;

standby computers which are either idle or have been switched off are primarily used to transfer failed software units;

if sufficient standby computers are not available, active computers are run down in order to receive images depending on the value of their attributes—applications or services are correspondingly terminated in order to transfer failed services or applications;

the submethods for determining the transfer scenario operate in such a manner that the selected transfer scenario has the most minor effects on the active computers—the selected transfer scenario should simultaneously satisfy the condition of transferring as many failed software units as possible;

all important software units are first of all transferred to other computers in accordance with the abovementioned rules and the attributes which have likewise been described—if no transfer scenario which satisfies all of the requirements is possible, failed software units are excluded from the determination of a transfer scenario;

there is only one transfer per software unit—software units which have been terminated cannot, for their part, terminate other active software units; there is no domino effect for computers having a low priority because they are frequently the victim of transfers.

So that a transfer scenario can still be calculated, the status of the computers at a defined point in time is considered. This is repeated at defined intervals of time. All of the computer failures are handled at the same time in a single determination entity, so that the number of failed computers is fixed at a particular point in time and does not change while determining the transfer scenario. If further computers fail while calculating the transfer scenario, these failures are not taken into account until the next monitoring time.

In an extended method, the ownership of the computers and the hardware of the computers can be taken into account in order to avoid "wasting" a powerful computer for a software unit which does not have sufficient importance for such a computer. Taking into account the ownership of a computer is important because it is customary in server farms for a customer to have its own server operated in the server farm. This inevitably results in such a computer not being available as a computer for transferring extraneous software units but rather only being able to be used by this customer.

The ownership of the computers is taken into account using a third attribute "server group". A transfer scenario is only determined using computers which belong to the same "server group". The type of hardware of the computer is taken into account using a "server class" attribute. The more the failed computers correspond to the hardware of the computers which are taken into account for the transfer, the greater the affinity to this computer. "Suitable" is defined in consideration of the integer and string comparisons, as explained below.

In one practical implementation, the attributes are stored in the form of strings or integers. If the individual attributes are compared, the operators '<, <=, >, >=, ==, /=' are used. Only the operator '==' is permissible for strings. On the basis of these settings, all of the computers and software units can be compared using the operators which were specified above. The optimal transfer scenario can thus be determined.

In this manner, all of the computers and all of the software units are investigated in order to determine whether they are a potential destination for a transfer. This is, of course, carried out only when it is necessary, that is to say when computers have failed and are to be transferred, if possible, to another computer.

The main task is to find the correct computers or software units which are run down in sight of the computers or software units which are running. The determination of this scenario may be a lengthy process. In the case of a large server farm having several hundred computers S and no standby computers, the number of variations to be taken into account when determining the transfer scenario in the case of a small number of failed computers F is calculated as $$\binom{S-F}{F}.$$

For a server rack having 20 computers, the number of permutations when five computers fail is greater than 3000. If a second server rack having a further 20 computers is added, the number of permutations is greater than 50,000.

In order to find an optimal transfer scenario from this large number of possible transfer scenarios, it may be necessary to use special computation methods. It must be ensured that the overall influence of each transfer scenario is taken into account. The effects depend on the attributes which were mentioned above.

While the possible transfer scenarios are being calculated, the effects on the overall system are advantageously continuously calculated and predicted, even at the same time. Only the scenarios in which it is possible to have more minor effects on the overall system than the transfer scenarios which have already been investigated are determined in detail. This requires a type of sorting of the permutations to be investigated in order to ensure that the solutions with the most minor effects are handled first.

This significantly speeds up the determination process. The determination process is terminated in advance if a transfer scenario which does not have any effects on active software units has been found. A so-called greedy algorithm is preferably used during the calculation.

The concept described is capable of finding a transfer scenario which influences the computers and software units (which are running) to as slight an extent as possible, as many software units as possible nevertheless being transferred.

The method according to the invention can also be used in virtual servers. Virtual servers are formed by one or more large servers being subdivided into "logical" servers and the arrangement then being able to be operated as if it were a plurality of physical servers. The software used for this purpose is referred to, for example, as VmWare.

In a corresponding exemplary embodiment of the invention, a large LINUX server drives a number of WINDOWS emulations via VmWare. The individual operating systems are monitored in exactly the same manner and, if appropriate, are moved to another virtual server, as would be the case with a plurality of physical servers. It is also possible to configure the system in such a manner that a computer is first of all restarted before the movement operation. This is of particular interest in virtual computers. If sufficient VmWare servers are not available, the "normal" movement path can be followed or a less important image is displaced and VmWare is started instead in order to be able to move the virtual servers which have failed or have been overloaded.

Having described embodiments of a method for operating an arrangement of a plurality of computers, in which the best possible availability of the software units which are executed in the computer arrangement, is ensured, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

LIST OF REFERENCE SYMBOLS

1, 2, 3, 4 Computers
5 Monitoring computer
6 Lines
11 . . . 19 Method steps
OS1, OS2, OS3 Operating systems
A1, A2, A3, A4 Applications
D1, D2, D3, D4, D5 Services

What is claimed is:

1. A method for operating a server farm including an arrangement of a plurality of computers that are configured to execute a plurality of software units, and an additional monitoring computer to conduct repeated monitoring of the status of the plurality of computers and the intervening of the plurality of computers, wherein the software units are assigned a weighting according to a selected importance criteria, the method comprising:

when at least one computer has been determined as failing, collecting information at scheduled monitoring times and in relation to which of the computers have failed and which software units are thereby affected;

determining a plurality of possible transfer scenarios for transferring the affected software units from failed computers to active computers including terminating active software units based on the weighting so as to establish free capacity for transferring software units from computers that have failed, wherein the weighting is achieved via criteria comprising a plurality of attributes including: a first attribute that specifies a measure of the power to have other active software units terminated thereby creating free capacity, and a second attribute that specifies a measure of the resistance to the request for termination by other software units that are to be transferred from a failed computer and each transfer scenario indicates which software units are to be transferred to which active computers;

assessing the possible transfer scenarios based upon the weighting of the software units;

selecting a transfer scenario based on the assessment of possible transfer scenarios; and executing the selected transfer scenario.

2. The method of claim 1, further comprising:

transferring the affected software units to a reserve computer with sufficient free capacity.

3. The method of claim 1, wherein the attributes of the software units that are active in the computer arrangement and of the software units that are affected by failed computers are considered in selecting the transfer scenario such that the selected transfer scenario is optimal to the software units in the overall arrangement of the plurality of computers.

4. The method of claim 3, wherein the possible transfer scenarios are sorted according to predetermined criteria prior to selection of the optimal transfer scenario.

5. The method of claim 3, further comprises using a greedy algorithm to select the optimal transfer scenario from the possible transfer scenarios.

6. The method of claim 1, wherein each of the software units includes an operating system and applications.

7. A system comprising: a plurality of computers that execute a plurality of software units, and a monitoring computer to repeatedly monitor the status of the plurality of computers and to intervene with the plurality of computers, in response to at least one of the plurality of computers failing, wherein the monitoring computer is configured to execute the following steps:

collect information at scheduled monitoring times and in relation to which of the computers have failed and which software units are thereby affected;

determine a plurality of possible transfer scenarios for transferring the affected software units from failed computers to active computers including terminating active software units based on the weighting so as to establish free capacity for transferring software units from computers that have failed, wherein the weighting is achieved via criteria comprising a plurality of attributes including: a first attribute that specifies a measure of the power to have other active software units terminated thereby creating free capacity, and a second attribute that specifies a measure of the resistance to the request for termination by other software units that are to be transferred from a failed computer and each transfer scenario indicates which software units are to be transferred to which active computers;

assess the possible transfer scenarios based upon the weighting of the software units;

select a transfer scenario based on the assessment of possible transfer scenarios; and execute the selected transfer scenario.

* * * * *